(12) United States Patent
Genoni et al.

(10) Patent No.: US 9,880,709 B2
(45) Date of Patent: *Jan. 30, 2018

(54) SYSTEM AND METHOD FOR CREATING AND DISPLAYING PREVIEWS OF CONTENT ITEMS FOR ELECTRONIC WORKS

(71) Applicant: Inkling Systems, Inc., San Francisco, CA (US)

(72) Inventors: Thomas Charles Genoni, San Francisco, CA (US); Aashay Desai, Berkeley, CA (US)

(73) Assignee: INKLING SYSTEMS, INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/344,205

(22) Filed: Nov. 4, 2016

(65) Prior Publication Data
US 2017/0075530 A1 Mar. 16, 2017

Related U.S. Application Data

(63) Continuation of application No. 13/759,309, filed on Feb. 5, 2013, now Pat. No. 9,519,624.

(51) Int. Cl.
*G06F 3/0483* (2013.01)
*G06F 17/21* (2006.01)
(Continued)

(52) U.S. Cl.
CPC ........ *G06F 3/0483* (2013.01); *G06F 3/04845* (2013.01); *G06F 17/212* (2013.01);
(Continued)

(58) Field of Classification Search
None
See application file for complete search history.

(56) References Cited

U.S. PATENT DOCUMENTS 6,211,876 B1 4/2001 Ackermann et al.
6,892,348 B1 * 5/2005 Truelove ............... G06F 17/214
715/255

(Continued)

OTHER PUBLICATIONS

Notice of Allowance dated May 17, 2016, from U.S. Appl. No. 13/487,041, filed Jun. 1, 2012, 16 pgs.

(Continued)

*Primary Examiner* — Asher Kells
(74) *Attorney, Agent, or Firm* — Ascenda Law Group, PC

(57) ABSTRACT

Systems and methods for displaying, responsive to user-designation of a desired set of media object previews for view, the previews of the media objects of an electronic content work within a single view on a display of a computer system. The view presents those previews of the media objects of the electronic content work appropriate for one or more target rendering environments, according to user-specified display criteria. The previews may be images of the media objects captured when the subject media objects were rendered in a simulated target rendering environment. In some cases, these may be images of the media objects captured with the media objects were in desired states during rendering thereof in the simulated target rendering environment. The view may present the previews according to user-defined size criteria.

16 Claims, 10 Drawing Sheets

(51) Int. Cl.
*G06F 17/22* (2006.01)
*G06F 3/0484* (2013.01)
*G06F 17/24* (2006.01)

(52) U.S. Cl.
CPC .......... *G06F 17/2247* (2013.01); *G06F 17/24* (2013.01); *G06F 17/241* (2013.01)

(56) References Cited

U.S. PATENT DOCUMENTS

| | | | |
|---|---|---|---|
| 7,689,908 | B2 | 3/2010 | Yan et al. |
| 7,761,591 | B2 | 7/2010 | Graham |
| 9,142,192 | B2 | 9/2015 | Hou |
| 2001/0041973 | A1 | 11/2001 | Abkowitz et al. |
| 2002/0011990 | A1 | 1/2002 | Anwar |
| 2003/0177441 | A1 | 9/2003 | Clarke et al. |
| 2007/0022442 | A1 | 1/2007 | Gil et al. |
| 2009/0296119 | A1* | 12/2009 | Kurihara ............ B41J 13/0036 358/1.9 |
| 2010/0131293 | A1 | 5/2010 | Linthicum et al. |
| 2010/0131482 | A1 | 5/2010 | Linthicum et al. |
| 2011/0007091 | A1 | 1/2011 | Homma et al. |
| 2011/0117999 | A1 | 5/2011 | Anderson et al. |
| 2011/0295830 | A1 | 12/2011 | Swahn |
| 2013/0024290 | A1 | 1/2013 | Berg et al. |
| 2013/0073998 | A1* | 3/2013 | Migos .................. G06F 17/212 715/776 |
| 2013/0179761 | A1 | 7/2013 | Cho et al. |
| 2014/0075344 | A1 | 3/2014 | Bentrup |
| 2014/0115435 | A1* | 4/2014 | Elseth ............... G06F 17/30011 715/229 |
| 2014/0115508 | A1* | 4/2014 | MacLean .............. G06F 3/0483 715/764 |
| 2014/0173393 | A1 | 6/2014 | Roy et al. |
| 2015/0248484 | A1 | 9/2015 | Yu et al. |

OTHER PUBLICATIONS

Response to Final Office Action filed Apr. 1, 2016, from U.S. Appl. No. 13/487,041, filed Jun. 1, 2012, 10 pages.

Final Office Action dated Feb. 10, 2016, from U.S. Appl. No. 13/487,041, filed Jun. 1, 2012, 13 pages.

Amendment and Response to Office Action filed Nov. 19, 2015, for U.S. Appl. No. 13/487,041, filed Jun. 1, 2012, 7 pages.

Non-Final Office Action dated Jul. 29, 2015, for U.S. Appl. No. 13/487,041, filed Jun. 1, 2012, 13 pages.

Amendment and Response to Final Office Action filed Apr. 20, 2015 from U.S. Appl. No. 13/487,041, filed Jun. 1, 2012, 8 pgs.

Final Office Action dated Jan. 20, 2015 from U.S. Appl. No. 13/487,041, filed Jun. 1, 2012, 11 pgs.

Amendment and Response to Office Action filed Nov. 11, 2014 from U.S. Appl. No. 13/487,041, filed Jun. 1, 2012, 8 pgs.

Office Action dated Jul. 15, 2014 from U.S. Appl. No. 13/487,041, filed Jun. 1, 2012, 13 pgs.

Notice of Allowance dated Aug. 10, 2016, from U.S. Appl. No. 13/759,309, filed Feb. 5, 2013, 7 pages.

Amendment and Response to Office Action filed Apr. 28, 2016, from U.S. Appl. No. 13/759,309, filed Feb. 5, 2013, 11 pages.

Non-Final Office Action dated Feb. 16, 2016, from U.S. Appl. No. 13/759,309, filed Feb. 5, 2013, 14 pages.

Amendment and Response to Final Office Action filed Jan. 22, 2016, from U.S. Appl. No. 13/759,309, filed Feb. 5, 2013, 10 pages.

Final Office Action dated Oct. 23, 2015, from U.S. Appl. No. 13/759,309, filed Feb. 5, 2013, 13 pages.

Amendment and Response to Office Action filed Jun. 26, 2015, from U.S. Appl. No. 13/759,309, filed Feb. 5, 2013, 9 pages.

Non-Final Office Action dated Mar. 27, 2015, from U.S. Appl. No. 13/759,309, filed Feb. 5, 2013, 12 pages.

"Generic containers the div and span elements", W3C Wiki (Jul. 15, 2011), http://www.w3.org/wiki/Generic_containers_the_div_and_span_elements, 5 pages.

Pouncey; et al., Beginning CSS: Cascading Style Sheets for Web Design, Wiley 3rd ed. (2011), 4 pages.

* cited by examiner

SYSTEM AND METHOD FOR CREATING AND DISPLAYING PREVIEWS OF CONTENT ITEMS FOR ELECTRONIC WORKS

RELATED APPLICATIONS

This application is a continuation of U.S. patent application Ser. No. 13/759,309, filed Feb. 5, 2013, the disclosure of which is incorporated herein by reference in its entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright Inkling Systems, Inc., All Rights Reserved.

FIELD OF THE INVENTION

The present invention is directed to systems and methods for creating and displaying previews, for example in the form of images, of content items of electronic works, and in particular such displays as provide for one or more users, in a single screen view, the ability to quickly review and compare layouts, formats and other attributes of content items from a single work or multiple works so as to permit the user(s) a convenient way to assess the content items as part of an editing process.

BACKGROUND

Development of traditional print media and other rich content (e.g., textbooks, travel books, magazines, cookbooks, how-to books, literature, and the like) involves many tasks, including managing edits and the overall publication process. Historically, these tasks have required the use of hard copy proofs (e.g., galleys) that editors and others review and mark up. As print media have transitioned to electronic media, the editing process has remained relatively unchanged in terms of the tools used by editors to review and revise the content. As such, publishers and others associated with new electronic media have not taken advantage of the flexibility that computer-based tools can bring to the publishing process.

SUMMARY OF THE INVENTION

In various embodiments, the present invention provides systems and methods for displaying, responsive to user-designation of a desired set of media object previews for view, the previews of the media objects of an electronic content work within a single view on a display of a computer system. The view presents those previews of the media objects of the electronic content work appropriate for one or more target rendering environments, according to user-specified display criteria. The previews may be images of the media objects captured when the subject media objects were rendered in a simulated target rendering environment. In some cases, these may be images of the media objects captured when the media objects were in desired states. For example, such states as existed when the media objects were rendered in the simulated target rendering environment. The view may present the previews according to user-defined size criteria.

Responsive to user manipulation of at least one presentation criterion for the previews, the view may be reformatted according to new one or more user-defined presentation criteria and previews appropriate to the new one or more user-defined presentation criteria presented on the display of the computer system. The new one or more user-defined presentation criteria may include one or more of a content work viewing mode, a target rendering environment size, a target rendering environment, a preview image size. In some instances, a notation may be associated with one of the previews, the notation facilitating later editing of an associated on one of the media objects and being indexed with the preview at a fixed coordinate reference location thereof.

In further embodiments the present invention provides for displaying, within a single view on a display of a computer system, two or more groupings of a set of image previews of related media objects of an electronic content work. Each grouping may consist of respective image previews formatted according to a target rendering environment for the media objects, each respective target rendering environment being different. The invention further facilitates, responsive to user input, tagging of one or more of the previews within the view. Each target rendering environment may represent a computer-based platform for presenting the media objects.

These and further embodiments of the invention are described in greater detail below.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments of the invention discussed in the present document.

DETAILED DESCRIPTION

Figure 1A:
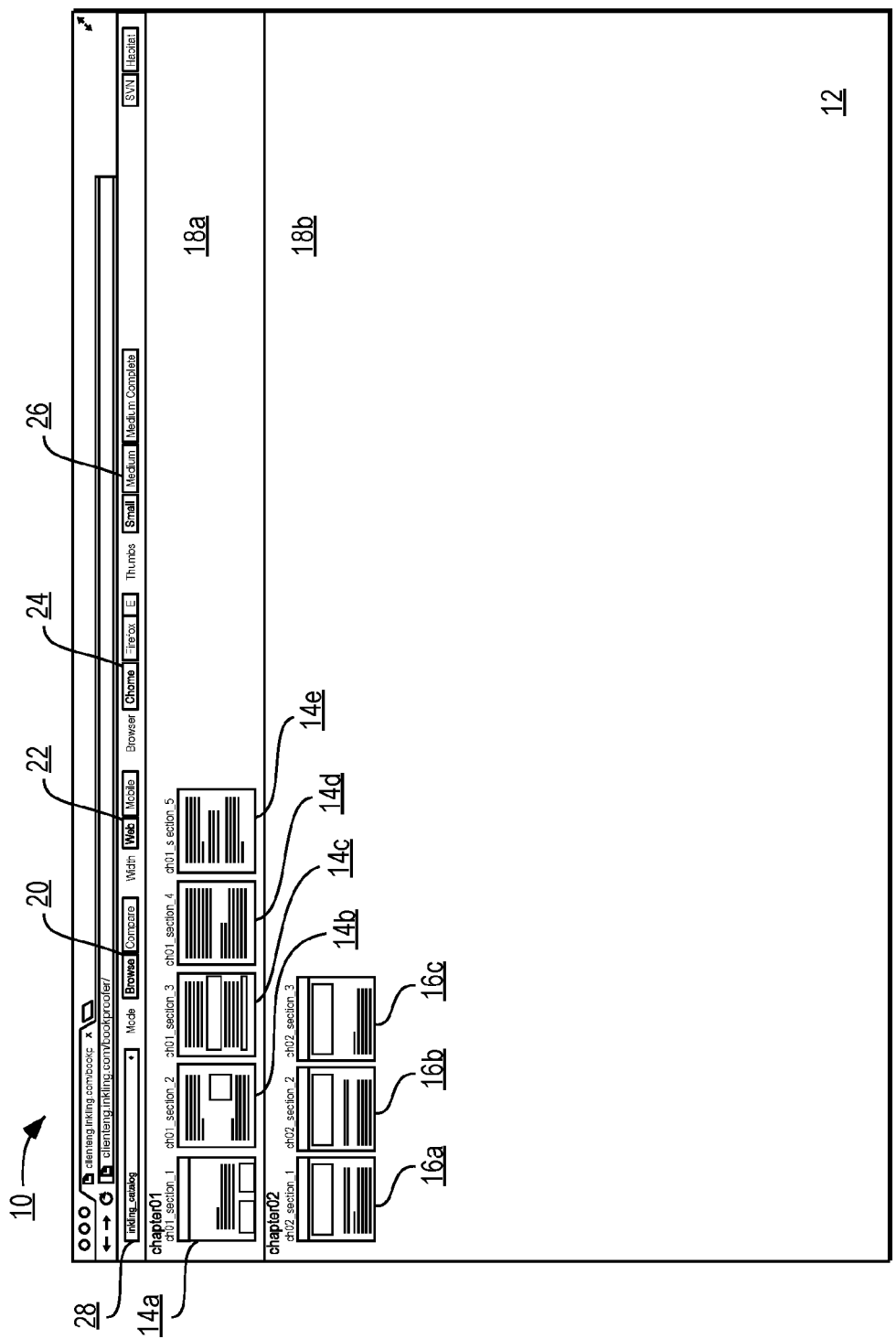
FIGS. 1A-1C, 2A, 2B, 3A and 3B illustrate aspects of a user interface for a content creation and editing tool configured in accordance with embodiments of the present invention.

Disclosed herein are systems and methods for creating and displaying previews, for example in the form of images, of content items of electronic works. In particular, the present invention provides a graphical user interface with various viewing options so as to provide users the ability to quickly review and compare layouts, formats and other attributes of content items from a single electronic work or multiple such works, thereby permitting the user(s) a convenient way to assess the content items as part of an editing process. By "content items" we mean media objects that may be formatted according to a variety of computer-readable or interpretable formats, as described more fully below, and which include human perceptible (e.g., readable or recognizable) content, such as text and/or images (either still or moving). In some instances, content items may be "cards" or "media cards", which are instantiations of markup language, e.g., extensible markup language ("XML"), hypertext markup language ("HTML"), or the like, files. Such cards may include, among other things, one or more text sections, one or more image sections, image captions, and header sections, all arranged in a desired order. A collection of related cards may form an electronic content work, for example an electronic book, magazine, article, etc., or a portion thereof, e.g., a section or chapter thereof, etc.

In U.S. patent application Ser. No. 13/353,180, filed 18 Jan. 2012, which application is assigned to the assignee of the present invention and incorporated herein by reference, systems and methods for publishing electronic content works are described. Included in the system are WYSIWYG (What You See Is What You Get) editors, which are editing interfaces in which the content displayed on the screen during editing appears in a form closely corresponding to its appearance in a target rendering environment (e.g., a Web browser, reader application, mobile device web browser, etc.). While these interfaces are useful for editing fine details, sometimes an editor needs to view the content in a different form. For example, when an editor wishes to determine whether the content conforms to layout guidelines specified for the electronic work under consideration, the editor needs to view several related pages (e.g., those which make up an entire chapter, an entire book, or even chapters from different books that are included in a common collection) at a time. Further, the editor may need to determine whether the content layout will render properly (and, perhaps, similarly) in different rendering environments on which it may be viewed (e.g., smart phones, tablet computers, desktop computers, etc.). Ideally, these views need to be available quickly (for example more quickly than it may take an editing tool to render markup language version of multiple content items) so as not to distract the editor from his/her workflow. The present invention facilitates such views and more.

In one embodiment then, the present invention provides a user interface for a computer-based publishing tool (or publishing environment) that facilitates a view of content items (such as cards) of one or more electronic works (such one or more electronic books, magazines, or other work(s) or portion(s) thereof). The content items may or may not be related, and where related may be deemed related by any of a number of criteria, including but not limited to content, subject, topic, hierarchical organization of an electronic work, layout, or other criteria. For example, content items may be related because they share a common cascading style sheet (CSS) class or other criteria. In some instances, the criterion (or criteria) for relating content items may be specified by a user, such as an editor, but this is not a requirement.

Associated with the user interface is a rendering engine that manipulates content items produced by the publishing tool for display according to user-selected target rendering environments. The target rendering environments may include web browsers, electronic reader applications, or other applications intended to execute on platforms such as personal computers, tablet computers, smart phones or other computer-based devices. In some instances rendering environments may be specified in terms of the target platform the content will be viewed upon, as selected from a menu of predetermined options.

The rendering engine is configured to produce previews of the content items, for example image previews, in the form in which the content items will be viewable by an end user in the target rendering environment. The previews are preferably images, for example, .png files, .jpg files, etc., of the content items, but the rendering engine may permit user manipulation of the content items within an environment that simulates the target rendering environment prior to the creation of an image of the content item. This allows the user to interact with content items so as to ensure the content items are in a desired state prior to the rendering engine producing the image previews.

For example, the rendering engine may be an environment that simulates a target web browser executing on a target computer-based platform. The Selenium™ integrated development environment is an example of such an environment. Content items may be submitted for display within the environment instantiated by the rendering engine and the user provided cursor control access thereto so as to allow the user to manipulate dynamic media elements (such as slideshow elements, sideline elements, guided tour elements, etc.) of the content items. When the user has manipulated the dynamic media elements so that the content items are in a desired state, the rendering engine may be instructed to produce a preview that captures that state in a static image (or other) format. In this way, media cards and other content items may be explored, and image previews captured, for all possible states in all desired target rendering environments.

FIG. 1A illustrates one example of a user interface (UI) 10 (e.g., as viewed in a window 12 of a web browser executing on a computer system) provided by a content creation and editing tool in accordance with an embodiment of the present invention. In this example, previews of cards 14a-14e, which together comprise a first chapter of an electronic work, and 16a-16c, which together comprise a second chapter of the electronic work, are presented for review. Although shown as being segregated into chapters in respective rows 18a and 18b of the UI 10, the previews may be organized in other fashions, for example in columns, or other manners, or need not be so segregated at all.

The previews 14a-14e and 16a-16c are thumbnail images of the actual media objects which comprise the cards. For example, the cards may be markup language (ML) documents and in one embodiment are S9ML documents. S9ML is a platform-agnostic, extensible markup language (XML) and hypertext markup language (HTML)-based specification that semantically describes the content in an electronic work. The electronic work may thus be a graph of content objects (described in S9ML) and the user interface 10 presents previews of the underlying content objects (in this case related pages that comprise various chapters) for display according to user-defined criteria. In other instances the media objects may be formatted differently, for example as MICROSOFT Corp. WORD® documents (.DOC, .DOCX), Adobe, Inc Portable Document Format (.PDF) or InDesign™ documents, ePub documents, etc.

The previews 14a-14e and 16a-16c are images and may conform to a graphics interchange (GIF) format, portable network graphics (PNG) format, joint photographic experts group (JPEG) format, exchangeable image file format (EXIF) format, tagged image file format (TIFF), raw image format, bitmap (bmp) format, scalable vector graphic (SVG) format, or other image format. These thumbnails are reduced sized versions of larger images, and may be created from the larger images through image reduction techniques common in the Web arts. For example, thumbnails may be created from larger images by reducing the pixel count of the larger image according to a predetermined algorithm (i.e., scaling the larger image). Creation of the larger images from the original media objects is discussed further below.

Presenting previews of all of the cards which may make up an electronic work, in the fashion illustrated in FIG. 1A, allows an editor (or other user of the content creation and editing tool) to rapidly check the cards for layout errors that may only be viewable when considering the work as a whole. For example, the layout and/or format of cross-chapter features, such as chapter titles, image captions, etc. can be quickly compared when viewing the cards for an entire work (or at least a significant portion thereof), as shown in this illustration. If errors (whether layout, formatting or otherwise) are found, the editor can quickly tag the error on the associated thumbnail (or revert to a larger view thereof and tag the larger view) for later correction. Because the previews are static image files and not markup language documents, etc., any notes so appended to the image will be separate therefrom but can be associated with a coordinate reference (e.g., an (x, y) location) of a point in the image and thereby indexed to the actual location within the original media object at which the correction needs to be made.

The thumbnail images which comprise previews 14a-14e and 16a-16c are only one example of the kind of image previews that can be presented in UI 10. Indeed, user controls provided via UI 10 allow an editor (or other user) to determine what kind of previews will be presented. For example, such controls may include a mode selector 20, a target size selector 22, a target rendering environment selector 24 and a preview size selector 26. Selectors 20, 22, 24 and 26 are examples of selectors for user-defined presentation criteria for the preview images and in various embodiments may be used to specify view criteria such as the target format in which the previews should be rendered. Examples of target formats include those suitable for tablet computer systems (e.g., Apple, Inc.'s iPAD), smart phones (e.g., Apple, Inc.'s iPHONE, or mobile phones running Google, Inc.'s ANDROID operating system), or web browsers running on personal computer systems (e.g., laptop computers, desktop computer systems, netbooks, etc.). In the present illustration the selectors are shown as clickable buttons along a toolbar within UI 10, but this is merely one possible instantiation of such controls. In other instances, the controls may be implemented as pull down menu items, selectable radio buttons, or other user-selectable elements of UI 10. UI 10 also includes a selector 28 for the electronic work of interest. This allows an editor (or other user) to rapidly move between different works and review previews of those different works.

Figure 1B:
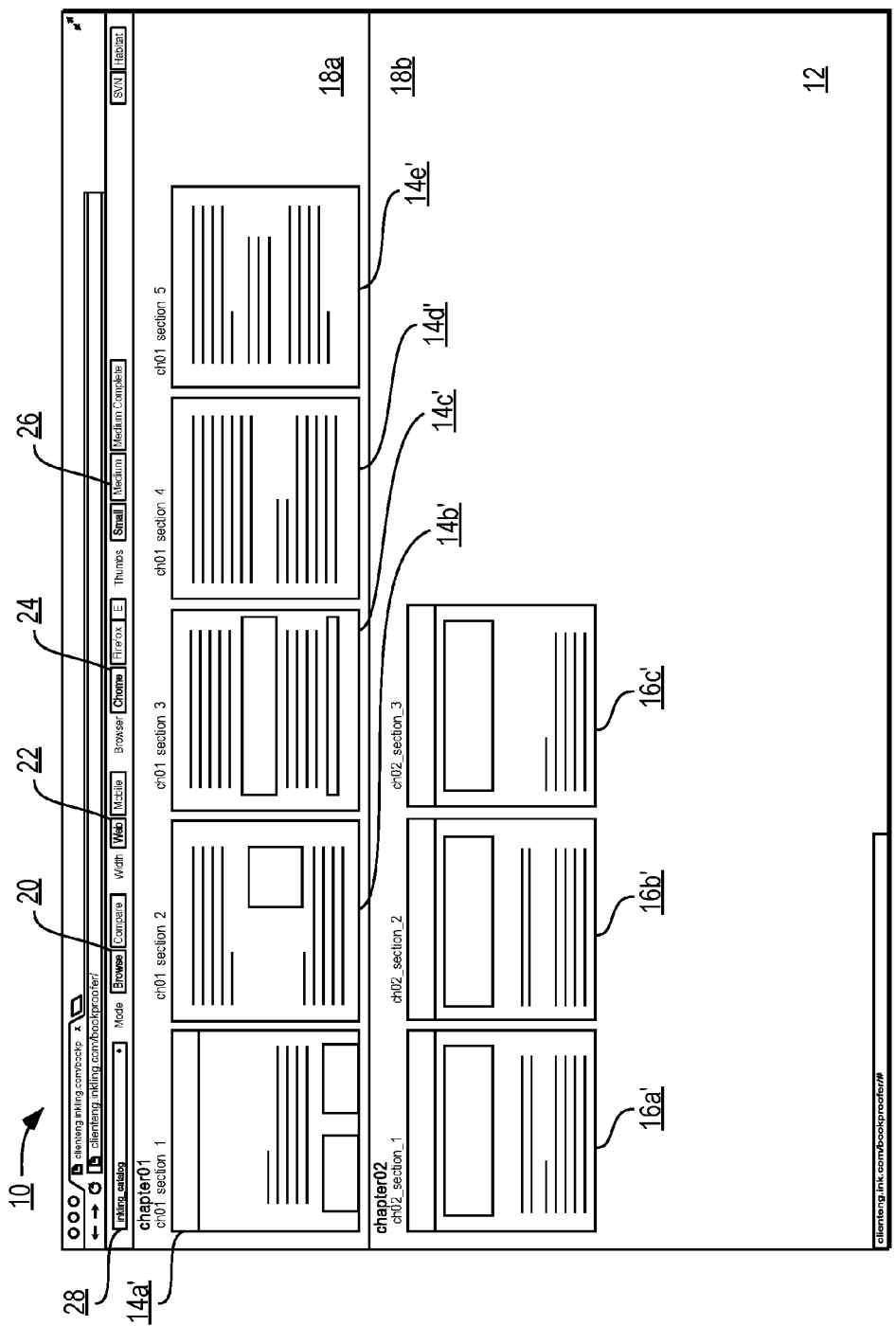

FIG. 1B illustrates the effect of a user changing the preview size using the preview size selector 26. Unlike the thumbnail previews 14a-14e and 16a-16c, which are presented in UI 10 when the preview size selector is set for "small" previews, larger size image previews 14a'-14e' and 16a'-16c' are displayed when the preview size selector 26 is set for display of "medium" size images. Medium size images are images that are larger than thumbnails but smaller than full card size images. Thus, the medium size previews 14a'-14e' and 16a'-16c' may be produced from the same full size images from which the thumbnail images shown in FIG. 1A are produced, but are larger in scale than those thumbnail images.

Figure 1C:
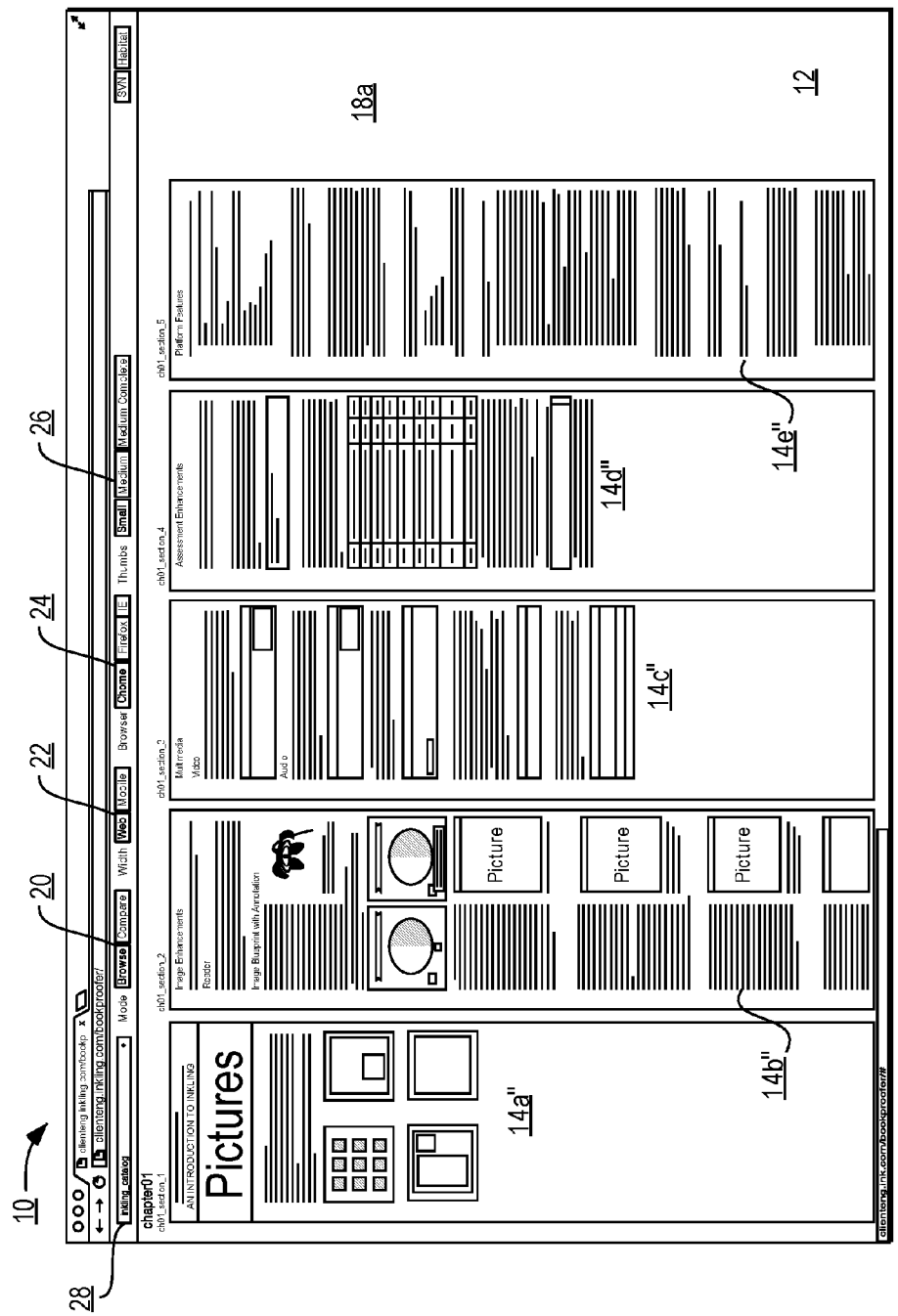

FIG. 1C further illustrates the effect of a user changing the preview size using the preview size selector 26. In this instance, previews 14a"-14e" and 16a"-16c", are presented in UI 10 as near-full size images when the preview size selector is set for "medium compare" previews. These near full-size previews are larger than the "medium" size images of FIG. 1B, yet small enough to allow an entire chapter's (or other section's) worth of previews to be presented on a single screen. This allows an editor (or other user) to make feature comparisons across the cards of an entire chapter.

Figure 2A:
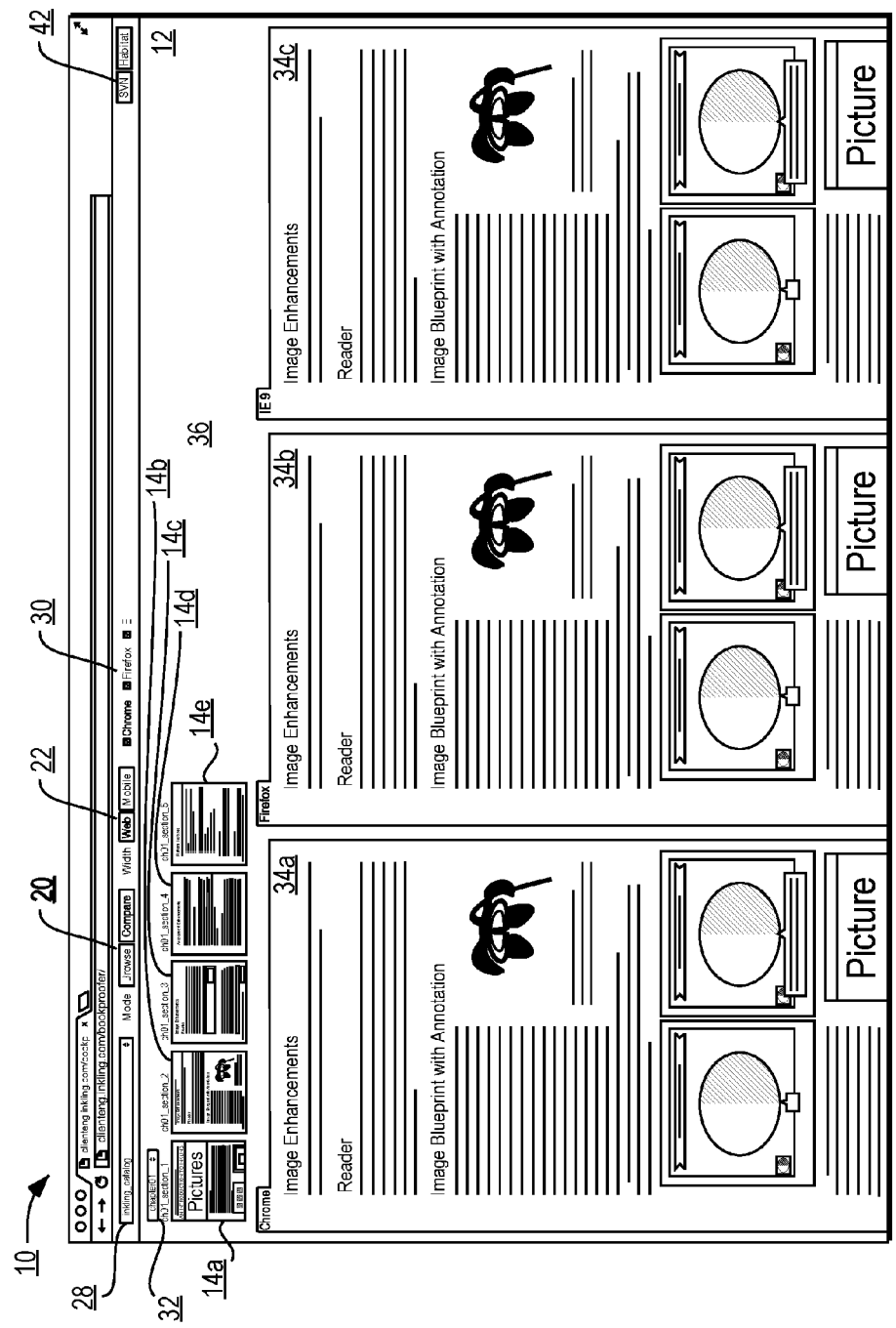
Figure 2B:
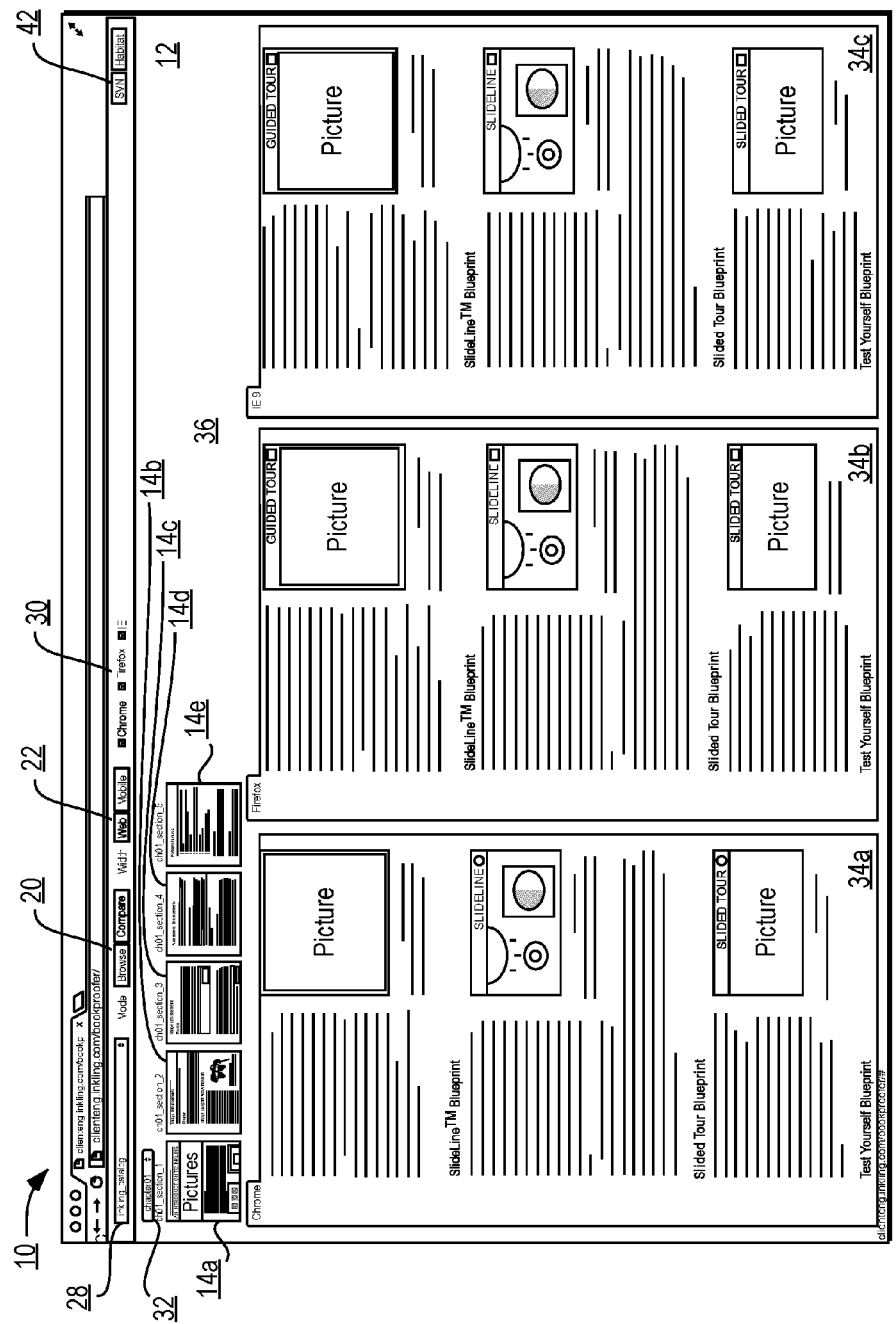

The mode selector 20, allows a user to toggle between a browse mode and a compare mode. In FIGS. 1A-1C, the mode selector was set to "browse", allowing an editor (or other user) to quickly examine multiple previews arranged side by side. FIGS. 2A and 2B illustrate views provided in the "compare" mode. In compare mode a single image preview, in this example, thumbnail 14b, is selected and corresponding full size image previews 34a, 34b and 34c are displayed. Each of the image previews shows the card represented by thumbnail 14b as it would appear in a different target rendering environment, as specified by target size selector 22 and selection menu 30.

The compare mode recognizes that some instances it may be beneficial for an editor to view the same content as it would appear in different rendering environments within a single, side-by-side, arrangement. In various embodiments, previews for two, three or more rendering environments may be presented, displayed side-by-side, in quadrants or in other sections of UI 10, so as to provide the editor a comprehensive look at how the same content would be formatted across different environments. By providing the editor with the ability to view the same content as would be displayed in different rendering environments, the present invention allows the editor to make decisions regarding content layout rapidly. For example, if text or images are not being rendered as desired in one set of display parameters or another, the editor can immediately determine the same and initiate corrections.

In the illustrated example, the target size is one suitable for viewing the underlying content in a Web browser (e.g., of a personal computer or similar platform), and the rendering environments are three different Web browsers (such as Microsoft Corporation's INTERNET EXPLORER, Google inc's. CHROME and Mozilla Foundation's FIREFOX). Image preview 34a corresponds to the card represented by thumbnail 14b as it would be rendered in a CHROME browser, image preview 34b corresponds to the card represented by thumbnail 14b as it would be rendered in a FIREFOX browser, and image preview 34c corresponds to the card represented by thumbnail 14b as it would be rendered in an INTERNET EXPLORER browser. As shown in FIG. 2B, the previews are scrollable, hence and editor or other user can compare an entire card's worth of content across all of these platforms by simply scrolling along the length of the previews (e.g., vertically).

Within the compare mode, thumbnail previews representing cards of different chapters (or other sections of an electronic content work) can be selected using section selector 32. Preferably, all of the thumbbnails for a given chapter (or other section) are presented in a single row 36, which may be laterally scrollable, if necessary.

Figure 3A:
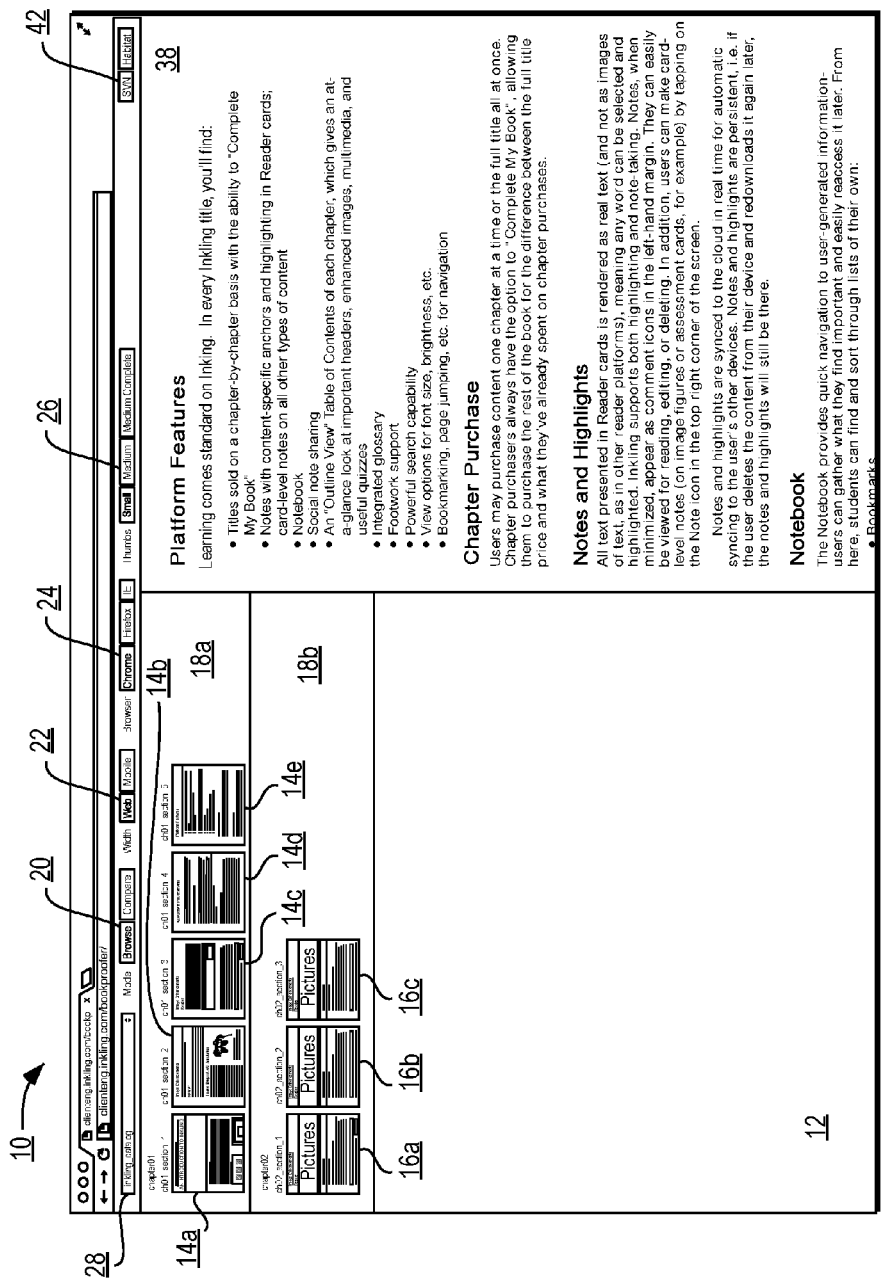
Figure 3B:
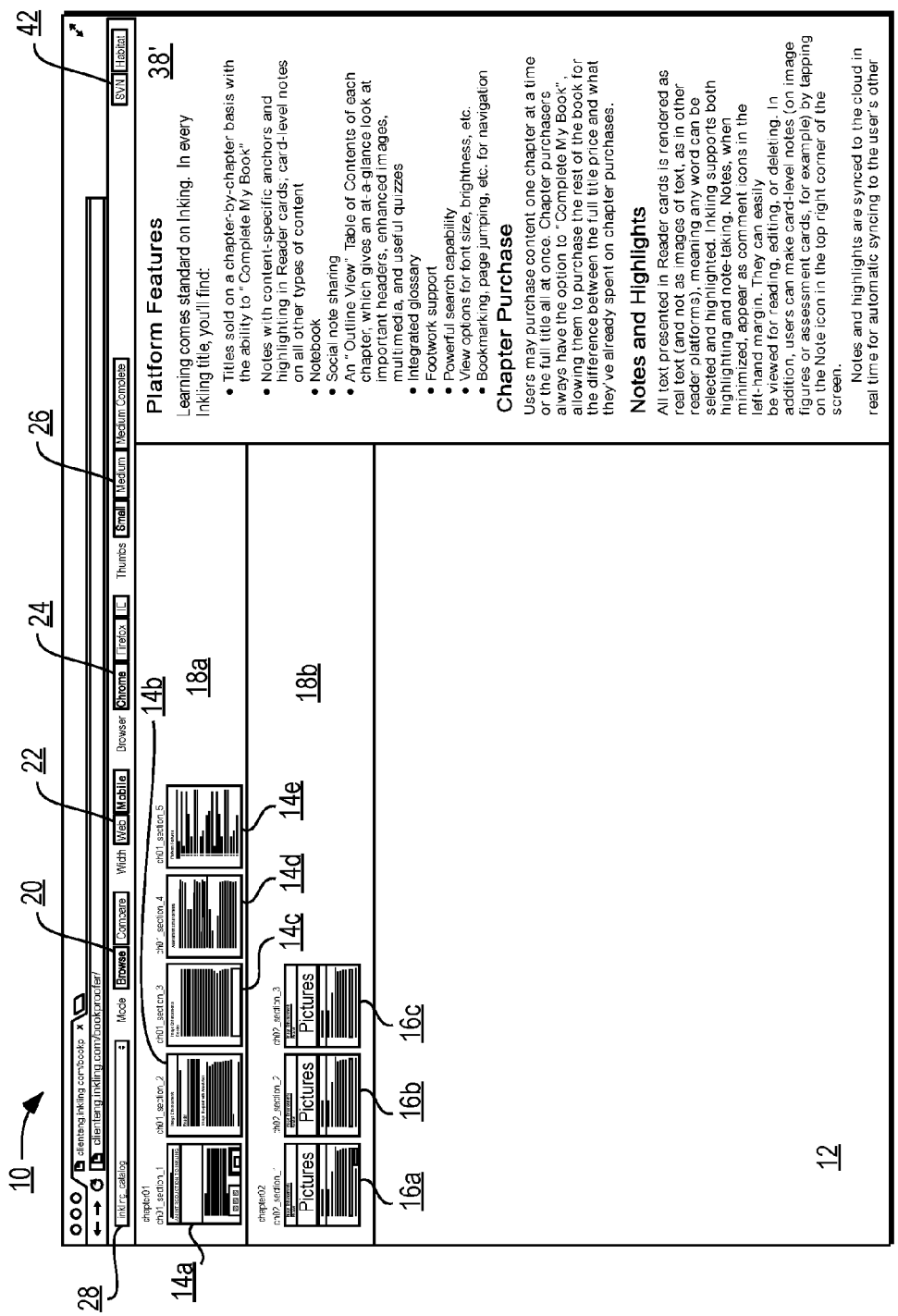

Turing now to FIGS. 3A and 3B, examples of different views provided through toggling of the target size selector 22 are shown. In these illustrations, thumbnail previews 14a-14e and 16a-16c are presented in UI 10 in browse mode and thumbnail 14e has been selected by an editor (or other user) for further inspection. Such selection causes a full size image preview 38 to be displayed in a right hand side frame 40. Image preview 38 is scrollable (so as to permit viewing of the entirety of the content of the card which it represents) and its size is determined by the setting of target size selector 22. In FIG. 3A, the target size selector 22 is set for Web-based content viewing, and so image 38 is one that is sized appropriately for such a platform (e.g., a Web browser on a personal computer or the like). In FIG. 3B, the target size selector 22 is set for viewing on a mobile device (e.g., a smart phone) and so image preview 38' is one that is sized appropriately for such an environment. In this example, the image preview 38' is narrower than image preview 38, although both represent the same card.

Although not shown in detail in these illustrations, target rendering environment selector 24 may be used to present full sized image previews of a selected thumbnail as appropriate for different rendering environments (e.g., INTERNET EXPLORER, CHROME, FIREFOX, etc.). Further, an editor mode selector 42 can be used to rapidly switch, in context, from the image preview UI 10 to a different user interface which would permit actual editing of the underlying media object associated with image 38, 38'. In this way, errors or other items can be immediately corrected. Of course, where such correction is not appropriate or would require more time than is available to the editor or other user, facilities may be provided for the editor to tag items requiring later correction. As indicated above, these tags may be in the form of notations associated with the image previews and indexed according to a fixed coordinate reference within a coordinate system of the preview so that the point at which the corrections specified in the notation need to be made may be immediately identifiable and transferable to the underlying media object.

Figure 4:
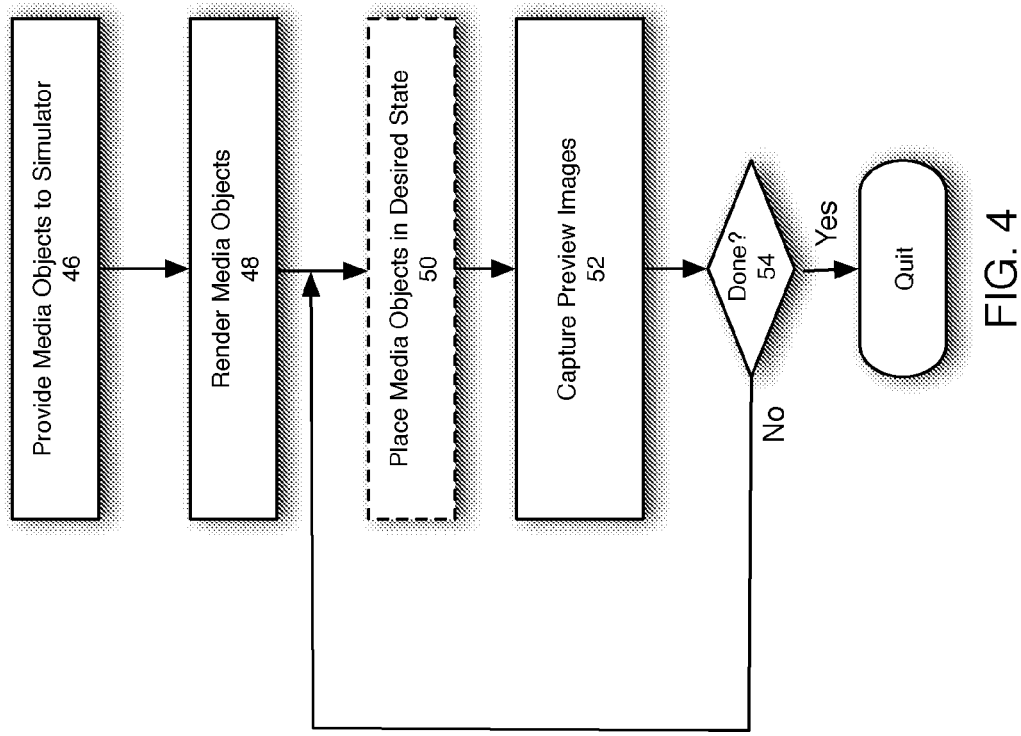
FIG. 4 is a flowchart illustrating aspects of a method of producing preview images, according to embodiments of the present invention.

Throughout the description thus far it has been noted that the images presented to the editor (or other user) in UI 10 are just that, images. The previews are created from the underlying media objects (e.g., cards) by rendering the media objects in a simulated target rendering environment and capturing a screenshot or equivalent image. For example, and referring to FIG. 4, in a process 44 for producing preview images a media object is first provided to a simulator. The simulator may be hosted locally with the content creation and editing tool or may be hosted remotely therefrom. In one embodiment, the simulator is configured as one or more virtual machines running on one or more servers, each virtual machine providing a target rendering environment within which the media object is rendered. For example, the virtual machines may emulate personal, tablet or other computer systems running various Web browsers and/or smart phones running mobile Web browser or dedicated reader applications. Of course, other target rendering environments may also be emulated in this fashion.

The subject media object is then rendered in one or more of the target rendering environments 48. This may involve, for example, displaying a card of an electronic work in a Web browser, a reader application, or both. Optionally, at 50, a user may interact with the media object as it is rendered in the target rendering environment. For example, if the media object includes dynamic elements such as slide shows, guided tours, etc., the user may manipulate the media object (or dynamic elements thereof) to place the media object in a desired state (e.g., displaying a second stage and the associated images of a guided tour, for example). For each such state, one or more preview images are captured and saved 52, and this procedure repeats 54 until all such image previews have been obtained. Preferably, this process 44 is an automated one (in which case the manipulation of the media objects to desired states may be performed according to programmatic control of the rendering environment) but semi-automated or manual image preview capture processes may also be employed. The saved image previews are then made available to the content creation and editing tool (e.g., from a database of image previews) and presented via UI 10 as described above.

In some embodiments, the image preview creation process may run in response to user command, on a periodic or other set basis, or may even run on a per-media object basis each time a change to a media object is made and/or saved as part of an overall editing process. In this way, a collection of image previews showing different versions of a media card as the card is edited over time may be captured and stored, allowing an editor or other user of the content creation and editing tool to quickly compare newer versions of a media object with older versions thereof. In addition to the HTML and other markup language cards discussed above, media objects for which image previews may be captured may include one or more text, graphic and visual elements.

Figure 5:
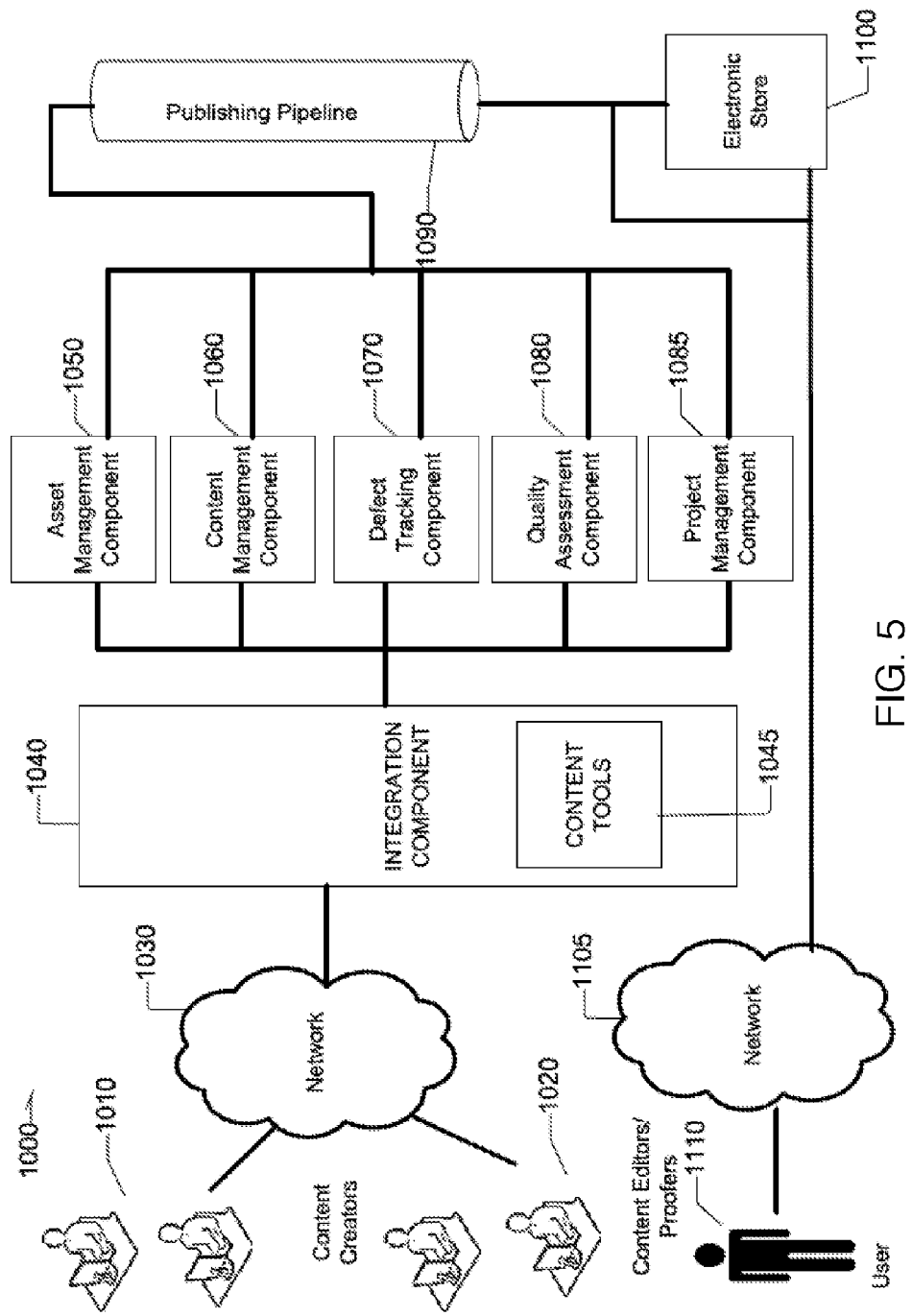
FIG. 5 illustrates an example of a content creation and editing system, which may include user interface tools consistent with embodiments of the present invention.

FIG. 5 illustrates an example of a content creation and editing tool 1000, which may include user interface tools such as those described above. The various components of the system 1000 may be connected to each other directly or through a network. For example, one or more content creators 1010 and one or more content editors 1020 or other contributors may utilize computing devices to interface with the system 1000 through network 1030. Network 1030 may include any electronic network that allows content creators 1010 and content editors 1020 to access the components of the system 1000. For example, one or more portions of network 1030, or network 1105 (which may be the same or different network as network 1030) may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, another type of network, or a combination of two or more such networks, or the like. While certain components of FIG. 5 may be shown as directly connected, they may also be connected through a network, such as a network similar to networks 1030 and 1105. For example, asset management component 1050, content management component 1060, defect tracking component 1070, quality assessment component 1080, project management component 1085, publishing pipeline 1090, electronic store 1100, and integration component 1040 may be connected directly, through a network, or through a combination of direct or network connections. Furthermore, while each component is logically separated from the other components for convenient description, it should be recognized that some or all of the functionality of one component might be performed by a different component.

Integration component 1040 may be a network-addressable component, which may provide a user interface that allows contributors, including content creators 1010 and content editors 1020, to interface with the rest of the system. In some examples, the interface may be a graphical user interface (GUI) that may allow content editors 1020 or other contributors to view, edit, and manage various portions of electronic content in the manners described above, e.g., using content tools 1045. Thus, content tools 1045 may include editing interfaces in which the content displayed on the screen includes preview images captured so that the cards, which the previews represent, appear in a form closely corresponding to their appearance in the target rendering environment, and according to user-specified criteria. Integration component 1040 may also facilitate communication between other various components of the system

1000. For example, integration component 1040 may direct one or more of the other components to take some action, communicate with another component, relay information between components, or the like.

In one example, integration component 1040 may be located on one or more computer systems accessible by content creators 1010 and content editors 1020 through network 1030. In yet other examples, integration component 1040 may be locally executable on computer terminals of contributors such as content creators 1010 and editors 1020 and may utilize network 1030 to access the other components of the system 1000. In yet other examples, integration component 1040 may include components executable on both the computer terminals of content creators 1010 and editors 1020 as well as pieces accessible and executing on a remote server accessible over network 1030.

In some examples, integration component 1040 may interface with asset management component 1050 in order to facilitate the presentation of the electronic content work from a number of content portions. Content portions may be any audio, visual, audiovisual, text, or other content that is intended to be merged with other content portions into an electronic content work. Content portions may also be referred to as "assets." Asset management component 1050 may be a network-addressable component, which, in conjunction with integration component 1040, may allow for the management of the content creation process by managing the submission, modification, and integration of various component portions of the electronic content. This creation management process may include indexing and tracking submitted components, identifying missing content, assigning sections of missing content to one or more contributors, and managing the integration of submitted content into a complete or nearly complete version of the electronic content work. In some examples, the asset management component 1050 may implement version tracking to track changes made to the component content portions.

Once the contributors are satisfied with the draft of the electronic work, the work may be submitted to the content management component 1060. In some examples, defect tracking through the defect-tracking component 1070 may also begin. Integration component 1040 may then coordinate the delivery of the content from the asset management component 1050 to the content management component 1060 (if necessary), coordinate starting of the version control of the work as a whole (in some examples, versions may be managed on the content portions and the work as a whole simultaneously), and coordinate starting the defect tracking process. Editors 1020 or other contributors may then begin editing the electronic content, for example using the user interface tools described above.

Defect tracking component 1070 may be a network-addressable component, which, in conjunction with integration component 1040, may include tools, which allow users to open defects, track defects, fix defects, and close defects found in electronic content. For example, an editor may be reviewing the content through content tools 1045 and may open defects by selecting or otherwise indicating the defect in the content itself and entering information about what is defective. Content tools 1045 may then pass this information to the defect-tracking component, which may open a defect. In other examples, defects may be opened by the quality assessment (QA) component 1080 as a result of automatic content checks performed by the quality assessment component 1080. The QA component may send a message to the defect-tracking component 1070 with information on the defect, and the defect-tracking component 1070 may open the defect.

In some examples, user access control may be implemented through various permission-based rules. In one example, users (e.g., contributors) may belong to one or more groups of users and content may be organized into one or more groups. User groups may be given access to one or more content groups. Each user group may have one or more users, and each content group may have one or more content portions. In other examples, each user is individually given access to various portions of content or groups of portions of content. A user or group of users may be granted read, write, delete, or other access types to a portion of the content or a content group.

In some examples, integration component 1040 also includes a device simulator, which may provide the previews described herein. Since the electronic content may be targeted to multiple and disparate electronic device platforms, and since the content may not be rendered identically across disparate electronic device platforms, integration component 1040 may include a device simulator which allows the contributor to build the content locally (or allows integration component 1040 to interface with the publishing pipeline 1090 to build the content) for the particular desired target electronic device and through an emulator running in the system preview how the content will look and react to input and other stimuli. The emulator emulates the environment of the target electronic device so the contributor will have an accurate representation of how the electronic content performs on the target electronic device.

Project management component 1085 may be a network-addressable component and may integrate with integration component 1040 or other components of system 1000 to control and store data related to project management of one or more electronic works. Once the content is ready for publication, one or more of the contributors may publish the electronic content work. Publication (or "building" the content) is a process by which a format independent representation of the content is transformed into a format dependent representation of the content. For example, the content may be customized for a particular client device (e.g., an iPAD). This process may be done through the integration component 1040, and the publishing pipeline 1090 may build content. Once the electronic content has been built by the publishing pipeline 1090, the publishing pipeline may distribute the published content, for example by interfacing with the electronic store 1100, which may then make the content available for download by an end-user 1110 on an electronic device over a network 1105.

Figure 6:
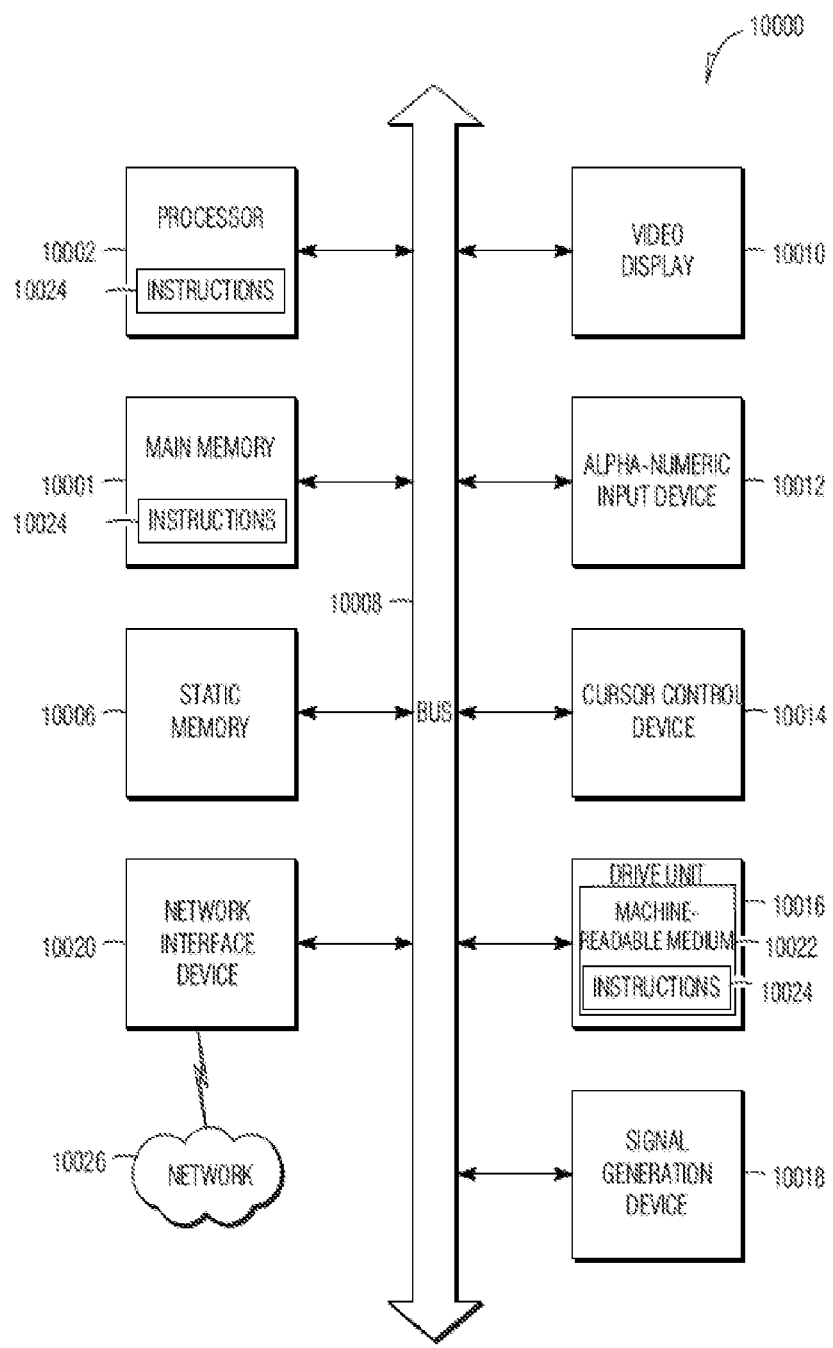
FIG. 6 shows an example of a processor-based system suitable for use in accordance with embodiments of the present invention.

The various operations of example methods described herein may be performed, at least partially, by one or more processors that are temporarily configured (e.g., by software) or permanently configured to perform the relevant operations. An example of a processor based system suitable for such configuration and operation is shown in FIG. 6. In other examples, however, the methods described herein may be at least partially performed by processors deployed across a number of machines, e.g., in a "cloud computing" environment or as "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Computer system 10000, shown in FIG. 6, within which a set of instructions for causing the machine to perform any one or more of the methods, processes, operations, or methodologies discussed herein may operate as a stand-alone device or may be connected (e.g., networked) to other machines. In a networked deployment, the machine may operate in the capacity of a server or a client machine in server-client network environment, or as a peer machine in a peer-to-peer (or distributed) network environment. Various instantiations of computer system 10000 may be servers or clients.

The example computer system 10000 includes a processor 10002 (e.g., a Central Processing Unit (CPU), a Graphics Processing Unit (GPU) or both), a main memory 10001 and a static memory 10006, which communicate with each other via a bus 10008. The computer system 10000 may further include a video display unit 10010 (e.g., a Liquid Crystal Display (LCD) or a Cathode Ray Tube (CRT)). The computer system 10000 also includes an alphanumeric input device 10012 (e.g., a keyboard), a User Interface (UI) cursor controller 10014 (e.g., a mouse), a disk drive unit 10016, a signal generation device 10018 (e.g., a speaker) and a network interface device 10020 (e.g., a transmitter).

The disk drive unit 10016 includes a machine-readable medium 10022 on which is stored one or more sets of instructions 10024 and data structures (e.g., software) embodying or used by any one or more of the methodologies or functions illustrated herein. The software may also reside, completely or at least partially, within the main memory 10001 and/or within the processor 10002 during execution thereof by the computer system 10000, the main memory 10001 and the processor 10002 also constituting machine-readable media.

The instructions 10024 may further be transmitted or received over a network 10026 via the network interface device 10020 using any one of a number of well-known transfer protocols (e.g., HTTP, Session Initiation Protocol (SIP)).

The term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding, or carrying a set of instructions for execution by the machine and that cause the machine to perform any of the one or more of the methodologies illustrated herein. The term "machine-readable medium" shall accordingly be taken to include, but not be limited to, solid-state memories, and optical and magnetic medium.

Method embodiments illustrated herein may be computer-implemented. Some embodiments may include computer-readable media encoded with a computer program (e.g., software), which includes instructions operable to cause an electronic device to perform methods of various embodiments. A software implementation (or computer-implemented method) may include microcode, assembly language code, or a higher-level language code, which further may include computer readable instructions for performing various methods. The code may form portions of computer program products. Further, the code may be tangibly stored on one or more volatile or non-volatile computer-readable media during execution or at other times. These computer-readable media may include, but are not limited to, hard disks, removable magnetic disks, removable optical disks (e.g., compact disks and digital video disks), magnetic cassettes, memory cards or sticks, Random Access Memories (RAMs), Read Only Memories (ROMs), and the like.

Thus, systems and methods for creating and displaying previews, for example in the form of images, of content items of electronic works, and in particular such displays as provide for one or more users, in a single screen view, the ability to quickly review and compare layouts, formats and other attributes of content items from a single work or multiple works so as to permit the user(s) a convenient way to assess the content items as part of an editing process have been described.

What is claimed is:

1. A computer-implemented method comprising:
launching an editing application and opening an electronic content work in the editing application;
receiving one or more edits to the electronic content work via the editing application;
receiving a user input designating a related plurality of pages of the electronic content work, the electronic content work having a hierarchical organization and comprising the related plurality of pages, and wherein the pages are related because they comprise a group defined by the hierarchical organization of the electronic content work;
displaying, responsive to the user input, the designated plurality of pages within a single view on a display of a computer system, the single view presenting rendered pages in a manner appropriate for one or more target rendering environments, according to user-specified display criteria, wherein the displayed pages incorporate the one or more edits.

2. The method of claim 1, wherein the displayed plurality of pages comprises a plurality of previews of one or more dynamic media elements, the respective views captured when the one or more dynamic media elements were rendered in a simulated target rendering environment.

3. The method of claim 2, wherein the previews comprise images of the dynamic media elements in desired states captured during rendering of the dynamic media elements in the simulated target rendering environment.

4. The method of claim 1, wherein the single view presents the designated plurality of pages according to user-defined size criteria.

5. The method of claim 1, further comprising, responsive to user manipulation of at least one presentation criterion for the designated plurality of pages, reformatting the single view according to a new one or more user-defined presentation criteria and presenting the pages in a manner appropriate to the new one or more user-defined presentation criteria on the display of the computer system.

6. The method of claim 5, wherein the new one or more user-defined presentation criteria comprises one or more of a content work viewing mode, a target rendering environment size, a target rendering environment, a preview image size.

7. The method of claim 1, further comprising associating a notation with an element within one of the designated plurality of pages, the notation facilitating later editing of the associated one of the pages.

8. A computer-based system comprising:
a server, implemented using one or more processors and configured to:
present, via a communicatively coupled client, an editing application, and open an electronic content work in the editing application;
receive, via the editing application, a first user input comprising one or more edits to the electronic content work;

receive, via the editing application, a second user input designating a related plurality of pages of the electronic content work, the electronic content work having a hierarchical organization and comprising the related plurality of pages, and wherein the pages are related because they comprise a group defined by the hierarchical organization of the electronic content work;

display, via the editing application and responsive to the user input, the designated plurality of pages within a single view on a display of a computer system, the single view presenting rendered pages in a manner appropriate for one or more target rendering environments, according to user-specified display criteria, wherein the displayed pages incorporate the one or more edits.

9. The system of claim 8, wherein the server is further configured to, responsive to user manipulation of at least one presentation criterion for the designated plurality of pages, reformat the view according to a new one or more user-defined presentation criteria and present the pages in a manner appropriate to the new one or more user-defined presentation criteria for display on the client.

10. The system of claim 9, wherein the new one or more user-defined presentation criteria comprises one or more of a content work viewing mode, a target rendering environment size, a target rendering environment, and a preview image size.

11. The system of claim 8, wherein the server is further configured to associate a notation with one of the designated plurality of pages, the notation facilitating later the associated one of the pages.

12. A computer-implemented method comprising:

launching an editing application and opening an electronic content work in the editing application;

receiving one or more edits to the electronic content work via the editing application;

receiving a user input designating a related plurality of pages of the electronic content work, the electronic content work having a hierarchical organization and comprising the related plurality of pages, and wherein the pages are related because they a group defined by the hierarchical organization of the electronic content work;

displaying, responsive to the user input, the designated plurality of pages within a single view on a display of a computer system as two or more groupings, the single view presenting rendered pages such that the pages in each respective grouping are the designated plurality of pages rendered according to a different target rendering environment, according to user-specified display criteria, and wherein the displayed pages incorporate the one or more edits.

13. The computer-implemented method of claim 12, wherein the designated plurality of pages comprises one or more dynamic media elements, and each target rendering environment represents a computer-based platform for presenting one or more dynamic media elements.

14. The computer-implemented method of claim 12, wherein the displayed plurality of pages comprises a plurality of previews of one or more dynamic media elements, the respective views captured when the one or more dynamic media elements were rendered in a respective target rendering environment.

15. The computer-implemented method of claim 12, wherein the view presents the displayed plurality of pages according to user-defined size criteria.

16. The computer-implemented method of claim 12, further comprising, responsive to user manipulation of at least one presentation criterion for the displayed plurality of pages, reformatting the view according to a new one or more user-defined presentation criteria and displaying pages appropriate to the new one or more user-defined presentation criteria on the display of the computer system.

* * * * *